United States Patent
Caples

(10) Patent No.: US 10,378,446 B2
(45) Date of Patent: Aug. 13, 2019

(54) THERMAL MANAGEMENT FOR INJECTORS

(71) Applicant: Delavan Inc, West Des Moines, IA (US)

(72) Inventor: Mark A. Caples, Ankeny, IA (US)

(73) Assignee: Delavan Inc, West Des Moines, IA (US)

( * ) Notice: Subject to any disclaimer, the term of this patent is extended or adjusted under 35 U.S.C. 154(b) by 643 days.

(21) Appl. No.: 14/943,460

(22) Filed: Nov. 17, 2015

(65) Prior Publication Data

US 2017/0138266 A1 May 18, 2017

(51) Int. Cl.
*F02C 7/22* (2006.01)
*B23P 15/00* (2006.01)
*F23R 3/28* (2006.01)

(52) U.S. Cl.
CPC .............. *F02C 7/222* (2013.01); *B23P 15/00* (2013.01); *F23R 3/283* (2013.01)

(58) Field of Classification Search
CPC .............. F23R 3/20; F23R 3/283; F02C 7/222
See application file for complete search history.

(56) References Cited

U.S. PATENT DOCUMENTS

| | | | | |
|---|---|---|---|---|
| 3,159,971 | A * | 12/1964 | Moebius | F23R 3/283 285/136.1 |
| 4,735,044 | A | 4/1988 | Richey et al. | |
| 7,043,922 | B2 * | 5/2006 | Thompson | F02C 7/222 239/404 |
| 7,841,368 | B2 * | 11/2010 | McMasters | B23P 6/007 138/109 |
| 8,443,608 | B2 * | 5/2013 | Williams | F02C 7/222 60/740 |
| 2009/0255102 | A1 | 10/2009 | McMasters et al. | |
| 2015/0135716 | A1 * | 5/2015 | Ginessin | F23R 3/28 60/737 |
| 2015/0192299 | A1 * | 7/2015 | Caples | F23R 3/283 60/740 |

FOREIGN PATENT DOCUMENTS

| | | |
|---|---|---|
| WO | WO-2009148680 A2 | 12/2009 |
| WO | WO-2015112385 A1 | 7/2015 |
| WO | WO-2015147935 A1 | 10/2015 |

OTHER PUBLICATIONS

Extended European Search Report for European Patent Application No. 16198781.3, dated Mar. 21, 2017.

* cited by examiner

*Primary Examiner* — Arun Goyal
(74) *Attorney, Agent, or Firm* — Locke Lord LLP; Scott D. Wofsy; Joshua L. Jones

(57) ABSTRACT

An injector for a gas turbine engine includes a feed arm including a primary and a secondary fluid passage. An inlet assembly is fixed at an upstream end of the feed arm having at least one inlet in fluid communication with the primary and the secondary fluid passages. A tip assembly is fixed at a downstream end of the feed arm having a fluid outlet in communication with the primary and secondary fluid passages for issuing a spray of fluid. The primary and secondary fluid passages are monolithically formed within the feed arm. At least one of the primary and secondary fluid passages includes a nonlinear section configured to provide increased residence time for cooling fluid in the first and second fluid passages.

14 Claims, 4 Drawing Sheets

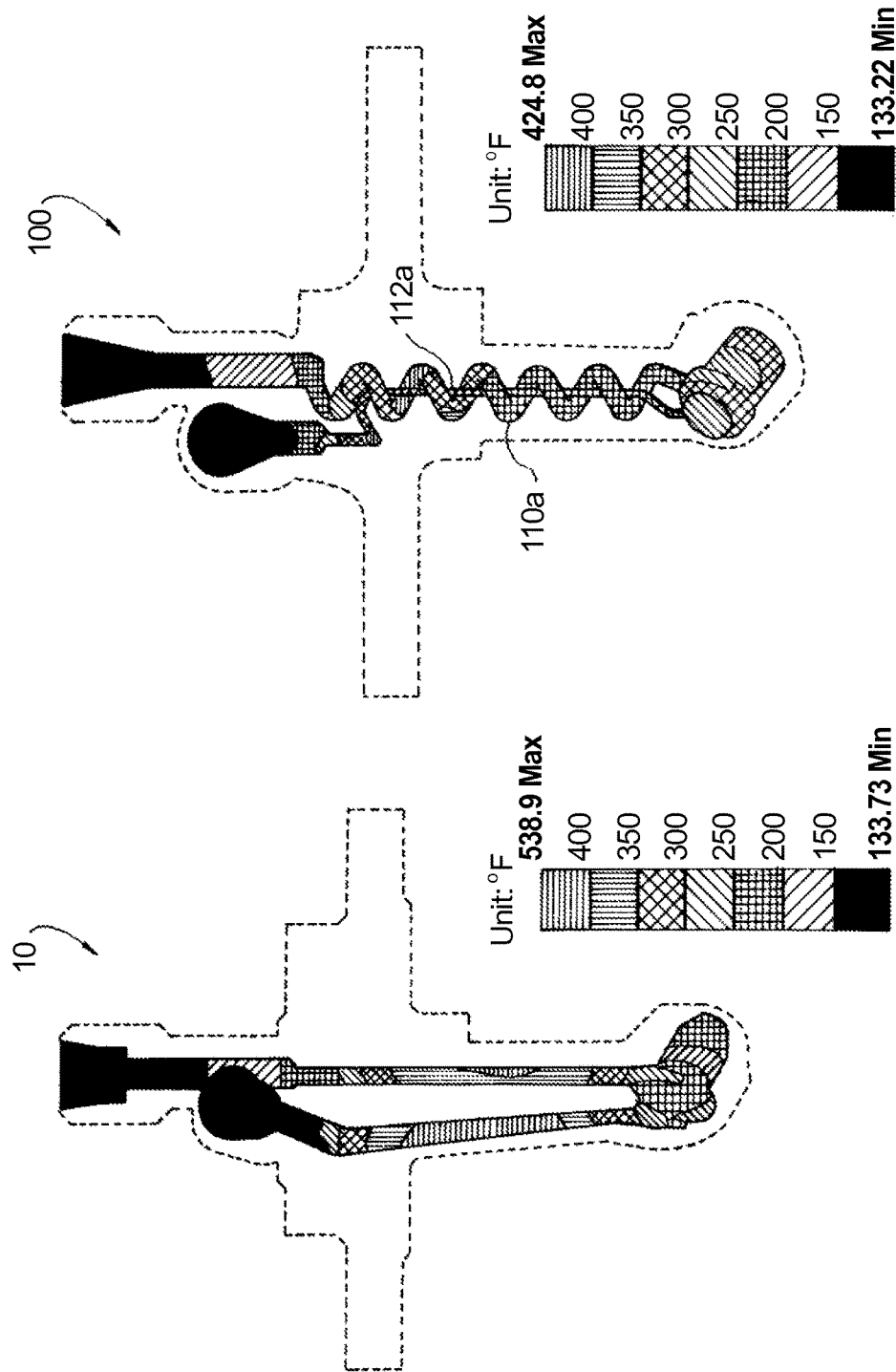

THERMAL MANAGEMENT FOR INJECTORS

BACKGROUND OF THE INVENTION

1. Field of the Invention

The present invention relates to fuel injectors, and more particularly, to fuel passages within a feed arm for a multiple circuit fuel injector of a gas turbine engine.

2. Description of Related Art

Typical fuel injectors include multiple fuel flow passages, allowing for the power output of the gas turbine engine to be more easily adjusted. For example, a fuel injector may have a primary fuel flow passage and a secondary fuel flow passage, with both passages being used during higher power operation and only the primary fuel flow passage being used during lower power operation.

Fuel injectors also typically include heat shields surrounding the tubular fuel passages to protect the fuel flowing through the passages from the heat generated in the combustion chamber as well as the heat of compressor discharge air. These heat shields help to prevent coking, the breaking down of the liquid fuel into solid deposits. Coking is likely to occur when the temperature of the wetted walls in a fuel passage exceeds a maximum value. When coking occurs, solid deposits can form within the fuel flow passage, which restricts the flow of fuel through the passage and can render the fuel injector ineffective or unusable. Fuel coking within the nozzle can cause reductions in fuel flow. This can lead to undesirable thermal gradients within the combustion system causing hardware distress and ultimately failure.

Such conventional methods and systems have generally been considered satisfactory for their intended purpose. However, there is still a need in the art for improved thermal management for fuel injectors. The present disclosure provides a solution for this need.

SUMMARY OF THE INVENTION

An injector for a gas turbine engine includes a feed arm having a primary and a secondary fluid passage. An inlet assembly is fixed at an upstream end of the feed arm having at least one inlet in fluid communication with the primary and the secondary fluid passages. A tip assembly is fixed at a downstream end of the feed arm having a fluid outlet in fluid communication with the primary and secondary fluid passages for issuing a spray of fluid into a combustion chamber. The primary and secondary fluid passages are monolithically formed within the feed arm. At least one of the primary and secondary fluid passages includes a nonlinear section configured to provide extended residence time for cooling fluid in the first and second fluid passages.

For optimum active cooling, the nonlinear section of the secondary fluid passage can be axially adjacent a linear section of the primary fluid passage. The nonlinear section of the secondary fluid passage can circle around a linear section of the primary fluid passage in a helical shape. It is also contemplated that the nonlinear section of the secondary fluid passage can be serpentine in shape. The nonlinear section of secondary fluid passage and a linear section thereof together can be three times greater in length than a linear section of a standard fluid passage. The nonlinear section of the secondary fluid passage can extend along a majority of the axial extent of the feed arm. The first and second fluid passages can be formed by additive manufacturing.

A heat shield can be disposed around the feed arm and can be formed by additive manufacturing such that the heat shield can be monolithically formed with the primary and secondary fluid passages.

The inlet assembly can include separate respective fluid inlets for each of the primary and secondary fluid passages. The injector can include an air shroud additively manufactured monolithic with the tip assembly.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 4 is a side view of a prior art injector, showing metal temperatures of the fluid passages within the feed arm; and FIG. 5 is a side view of the injector of FIG. 1, showing the significant reduction of metal temperatures as a results of active cooling of the fluid within the primary and secondary fluid passages.

DETAILED DESCRIPTION OF THE PREFERRED EMBODIMENTS

Figure 1:
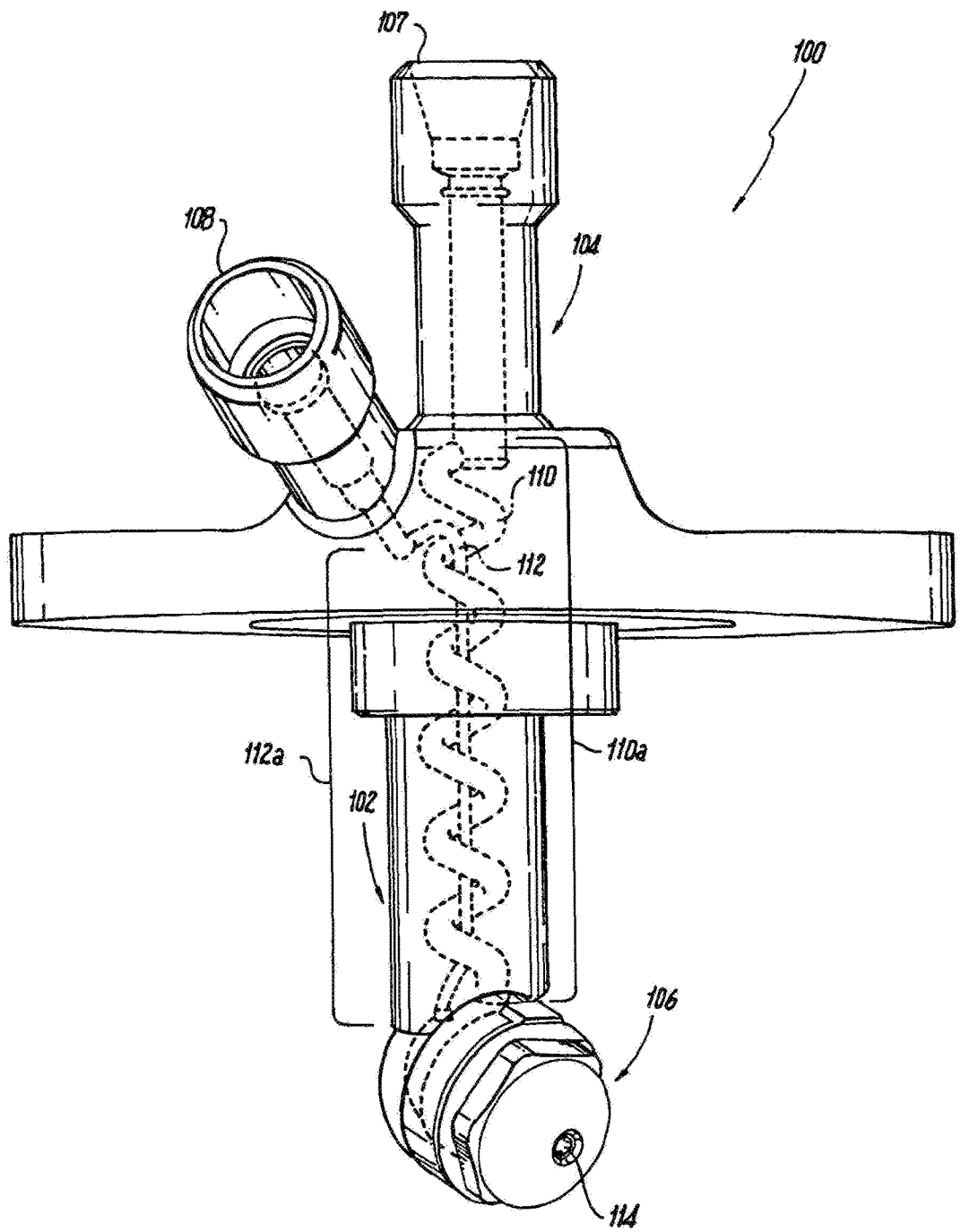
FIG. 1 is a perspective view of an exemplary embodiment of an injector constructed in accordance with the present disclosure, showing at least one of a primary and second fluid passage having a nonlinear section.

Reference will now be made to the drawings wherein like reference numerals identify similar structural features or aspects of the subject disclosure. For purposes of explanation and illustration, and not limitation, a partial view of an exemplary embodiment of an injector in accordance with the disclosure is shown in FIG. 1 and is designated generally by reference character 100. Other embodiments of the injector in accordance with the disclosure, or aspects thereof, are provided in FIGS. 2-5, as will be described.

A typical injector, for example a fuel injector for turbine engine, includes an elongated feed arm, having an inlet assembly at the upper end thereof and a tip assembly at the lower end thereof. Traditional fuel injectors typically include a plurality of separately machined parts or components that are assembled using numerous braze and weld joints, which tend to limit the design and/or manufacturability of the assembly.

In contrast to traditional fuel injectors, the exemplary embodiment injector of the subject disclosure, shown in FIG. 1, which is designated generally by reference numeral 100, includes a feed arm 102 having an inlet assembly 104 at an upstream end of the feed arm 102 and a tip assembly 106 at a downstream end of the feed arm 102. Similar to typical fuel injectors, the feed arm 102 includes primary and secondary fluid passages 110 with the inlet assembly 104 including separate respective fluid inlets 107, 108 for each of the primary and secondary fluid passages 110, 112. The tip assembly 106 has a fluid outlet 114 in communication with the primary and secondary fluid passages 110, 112 for issuing a spray of fluid. The primary and secondary fluid passages 110, 112 are additively manufactured within the feed arm 102. Those skilled in the art will readily appreciate that the term additive manufacturing, as used herein, includes any suitable technique such as laser additive deposition, laser metal deposition, direct laser deposition, direct metal deposition, laser cladding and the like.

In accordance with the exemplary embodiment, the present disclosure facilitates the use of a rapid construction method for producing the feed arm. Specifically, direct metal laser sintering (DMLS) can be used to manufacture a monolithic nozzle body that eliminates joints, brazing and other aspects of the prior art nozzle construction. DMLS is an additive layer process that produces a metal component directly from a computer assisted design (CAD) model using a laser and a fine metal powder (e.g., cobalt and/or chrome alloy powders and Nickel-based alloy powders are especially suited for the turbine nozzle application disclosed herein, but any other suitable materials can be used).

The CAD model is sliced into thin layers (on the order of 0.02 mm) and the layers are then reconstructed layer by layer, with the laser fusing programmed areas of each powder layer in succession to the underlying layer. The layer thickness can be chosen based on a consideration of accuracy versus speed of manufacture.

Using additive manufacturing allows for the primary and secondary fluid passages 110, 112 to be monolithically formed with at least one of the primary and secondary fluid passages 110, 112 including a nonlinear section 110a. There are several manners in which typical fuel injectors attempt to cool the feed arm to prevent coking or oxidation. For example, cooling chambers can be formed around the engine or cooling fluid may be passed around the exterior surface to cool the components. However, if the fluid passes through the feed arm too quickly, the fluid may not provide sufficient cooling effects. The nonlinear section 110a of the present disclosure provides extended residence time for fluid in the feed arm 102 in the primary and secondary passages 110, 112 to allow for additional cooling compared to traditional configurations.

Figure 2:
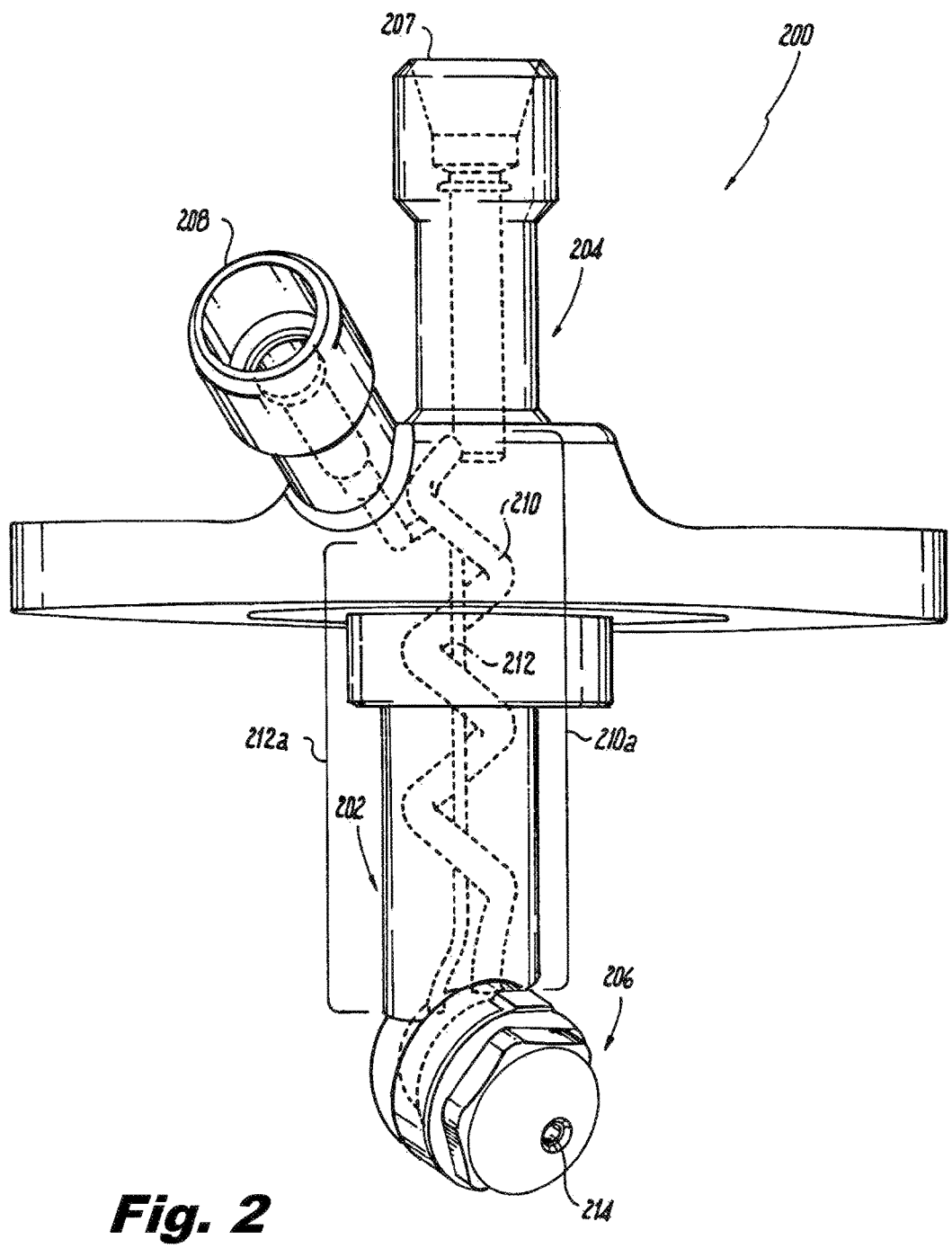
FIG. 2 is a perspective view of an alternate embodiment of the injector of FIG. 1, showing the nonlinear section being serpentine.

With continued reference to FIG. 1, the nonlinear section 110a of the secondary fluid passage 110 is a majority of the axial length of the passage such that the nonlinear section 110a of the secondary fluid passage is axially adjacent a linear section 112a of the primary fluid passage 112. FIG. 1 illustrates the nonlinear section 110a of the secondary fluid passage 110 circling the linear section 112a of the primary fluid passage 112 in a helical shape. FIG. 2 illustrates an alternate embodiment of injector 200, wherein the nonlinear section 210a of the secondary fluid passage 210 is shown in a serpentine shape. Those skilled in the art will recognize that the specific shape of the nonlinear section of the secondary fluid passage may vary without departing from the scope of the disclosure. Those skilled in the art will also recognize that the primary passage may also be formed in a nonlinear manner similar to the secondary passage to provide further cooling capacity.

Figure 3:
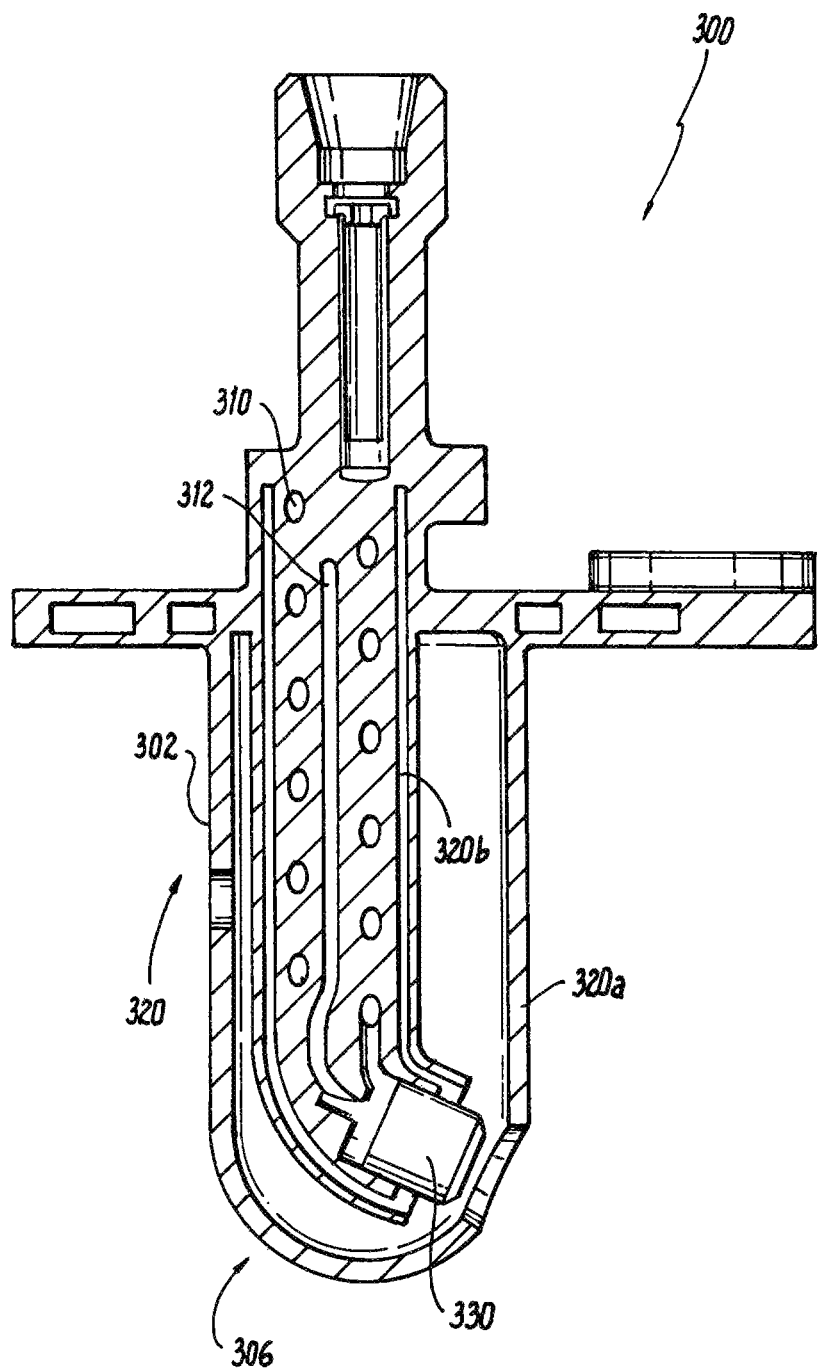
FIG. 3 is a cross-sectional view elevation of the injector of FIG. 1, showing a heat shield and an air shroud.

FIG. 3 represents another embodiment of injector 300 of the present disclosure. In this embodiment a heat shield 320 and a shroud 330 are additively manufactured to the feed arm 302. The heat shield 320 can further help to facilitate cooling for the fluid within the primary and second fluid passages 310, 312. Those skilled in the art will readily appreciate that various configurations can be included without departing from the scope of the disclosure. The heat shield 320 in the present disclosure can be made to be more effective because many of the limitations of the conventional machining and assembly are removed. The overall design can be made smaller, cheaper and lighter than typical injectors.

The air shroud 330 is additively manufactured with the injector assembly such that the air shroud 330 is positioned over the fluid outlet 314 to allow for a precise targeted fluid spray. Conventional injectors include air shrouds that must be added to the completed assembly which requires additional features to attach the shroud, such as brazing or welding. Further because of manufacturing tolerances and fit-ups, the engine case must also endure additional cost and complexity. The shroud 330, in the present disclosure, has a double advantage in that it eliminates a component and assembly step in the injector and the mating details with the engine case is less complicated, thus saving case weight.

As noted, the present disclosure creates fluid passages that provide active cooling that cannot be produced with conventional machining techniques. In typical machined injectors, the fluid passages are drilled and must be straight. A straight fluid passage in the prior art injector is approximately 1.25" long, for example, while fluid passage with a nonlinear section can be approximately 3.6" long over the same axial extent along the feed arm. This is about three times as long, which allows for three times as much cooling capacity. With reference to FIGS. 4 and 5 a comparison is shown of the active cooling effect between a typical injector 10 known in the prior art without a heat shield and the injector 100 disclosed herein with a nonlinear primary passage 110a. As evidenced, prior art injector 10 shows high wetted wall temperatures, however, the fluid passages 110a, 112a of the present disclosure provide wetted wall temperatures reduced by 114° F.

The methods and systems of the present disclosure, as described above and shown in the drawings, provide for an injector with superior properties including active cooling properties. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An injector for a gas turbine engine, comprising:
a feed arm comprising a primary fluid passage and a secondary fluid passage, a first aperture, a second aperture, and a fluid outlet;
an inlet assembly fixed at an upstream end of the feed arm, the inlet assembly in fluid communication with the first aperture, a first bore and the fluid outlet forming the primary fluid passage, the inlet assembly in fluid communication with the second aperture, a second bore and the fluid outlet forming the secondary fluid passage; and
a tip assembly fixed at a downstream end of the feed arm to the fluid outlet for issuing a spray of fluid,
wherein the primary fluid passage and the secondary fluid passage are monolithically formed within a monolithic structure of the feed arm, wherein the feed arm is devoid of gaps in a thermal conduction path between the structure, the primary fluid passage and the secondary fluid passage, wherein the feed arm is devoid of joints joining the primary fluid passage to the secondary fluid passage, and wherein each of the primary fluid passage and the secondary fluid passage has a flow area that is bounded by the structure, wherein the secondary fluid passage includes a nonlinear section configured to provide extended residence time for cooling the fluid in the primary fluid passage, wherein the nonlinear section of the secondary fluid passage is serpentine in shape and is axially adjacent a linear section of the primary fluid passage.

2. The injector of claim 1, wherein the nonlinear section of the secondary fluid passage circles around the linear section of the primary fluid passage.

3. The injector of claim 1, wherein the nonlinear section of the secondary fluid passage is helical in shape.

4. The injector of claim 1, the nonlinear section of the secondary fluid passage and a linear section of the secondary fluid passage thereof together are at least three times greater in length than a linear section of a standard fluid passage.

5. The injector of claim 1, wherein the nonlinear section of the secondary fluid passage extends along a majority of an axial extent of the feed arm.

6. The injector of claim 1, wherein the primary fluid passage and the secondary fluid passage are formed by additive manufacturing.

7. The injector of claim 1, further comprising a heat shield disposed around the structure of the feed arm.

8. The injector of claim 7, wherein the heat shield is formed by additive manufacturing.

9. The injector of claim 7, wherein the heat shield is monolithically formed with the primary fluid passage and the secondary fluid passage.

10. The injector of claim 1, wherein the inlet assembly includes separate respective fluid inlets for each of the primary fluid passage and the secondary fluid passage.

11. The injector of claim 1, further comprising an air shroud additively manufactured monolithic with the tip assembly.

12. A method of manufacturing an injector for a gas turbine engine, comprising:

additively manufacturing a feed arm, an inlet assembly at an upstream end of the feed arm, and a tip assembly at a downstream end of the feed arm;

the feed arm comprising a primary fluid passage and a secondary fluid passage; a first aperture, a second aperture, and a fluid outlet; the first aperture, a first bore and a fluid outlet forming the primary fluid passage; the second aperture, a second bore and the fluid outlet forming the secondary fluid passage, wherein the primary fluid passage and the secondary fluid passage are monolithically formed within a monolithic structure of the feed arm, wherein the feed arm is devoid of gaps in a thermal conduction path between the structure, the primary fluid passage and the secondary fluid passage, wherein the feed arm is devoid of joints joining the primary fluid passage to the secondary fluid passage, and wherein each of the primary fluid passage and the secondary fluid passage has a flow area that is bounded by the structure, the inlet assembly has at least one inlet in fluid communication with the primary fluid passage and the secondary fluid passage; and the tip assembly has the fluid outlet in fluid communication with the primary fluid passage and the secondary fluid passage for issuing a spray of fluid, wherein the secondary fluid passage includes a nonlinear section configured to provide extended residence time for cooling the fluid in the primary fluid passage, wherein the nonlinear section of the secondary fluid passage is serpentine in shape and is axially adjacent a linear section of the primary fluid passage.

13. The method of claim 12, further comprising: additively manufacturing a heat shield disposed around the structure of the feed arm.

14. The method of claim 12, further comprising:
additively manufacturing an air shroud with the tip assembly.

* * * * *